US008370754B2

(12) United States Patent  
Bull et al.

(10) Patent No.: US 8,370,754 B2
(45) Date of Patent: Feb. 5, 2013

(54) METHOD AND APPARATUS FOR PROVIDING A USER WITH DYNAMIC SYNC STATUS

(75) Inventors: William Bull, Campbell, CA (US); Kourtny Minh Hicks, Sunnyvale, CA (US); Policarpo Wood, Cupertino, CA (US); Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1079 days.

(21) Appl. No.: 12/075,324

(22) Filed: Mar. 10, 2008

(65) Prior Publication Data

US 2009/0064041 A1    Mar. 5, 2009

Related U.S. Application Data

(60) Provisional application No. 60/967,459, filed on Sep. 4, 2007.

(51) Int. Cl.
*G06F 3/00* (2006.01)
(52) U.S. Cl. ......................................... 715/748; 715/772
(58) Field of Classification Search .................. 715/748, 715/772
See application file for complete search history.

(56) References Cited

U.S. PATENT DOCUMENTS

| 7,369,517 | B2 * | 5/2008 | Dillinger et al. | 370/310 |
| 2004/0107242 | A1 * | 6/2004 | Vert et al. | 709/203 |
| 2005/0216855 | A1 * | 9/2005 | Kopra et al. | 715/767 |
| 2007/0150612 | A1 * | 6/2007 | Chaney et al. | 709/231 |
| 2007/0277122 | A1 * | 11/2007 | Frijlink et al. | 715/854 |
| 2008/0077422 | A1 * | 3/2008 | Dooley et al. | 705/1 |
| 2008/0256473 | A1 * | 10/2008 | Chakra et al. | 715/772 |
| 2008/0256474 | A1 * | 10/2008 | Chakra et al. | 715/772 |

OTHER PUBLICATIONS

Taylor, Dave. "How do I put music on my Apple iPod". http://www.askdavetaylor.com/how_do_i_put_music_on_my_apple_ipod.html, Aug. 15, 2006.*

* cited by examiner

*Primary Examiner* — Omar Abdul-Ali
(74) *Attorney, Agent, or Firm* — Park, Vaughan, Fleming & Dowler LLP

(57) ABSTRACT

Data files are selected for downloading from a host device to an electronic device via a sync process. Once the sync process starts, the electronic device provides the user with dynamic sync status information so that the user, for example, knows how much data has been downloaded, how much time is remaining in the download, what data files are being downloaded, etc. In addition, the user is also provided with the capability to obtain general summary information about the data files downloaded after the sync process is complete, as well as detailed summary information that may, for example, provide the user the names of each song downloaded and the size of each file.

35 Claims, 9 Drawing Sheets

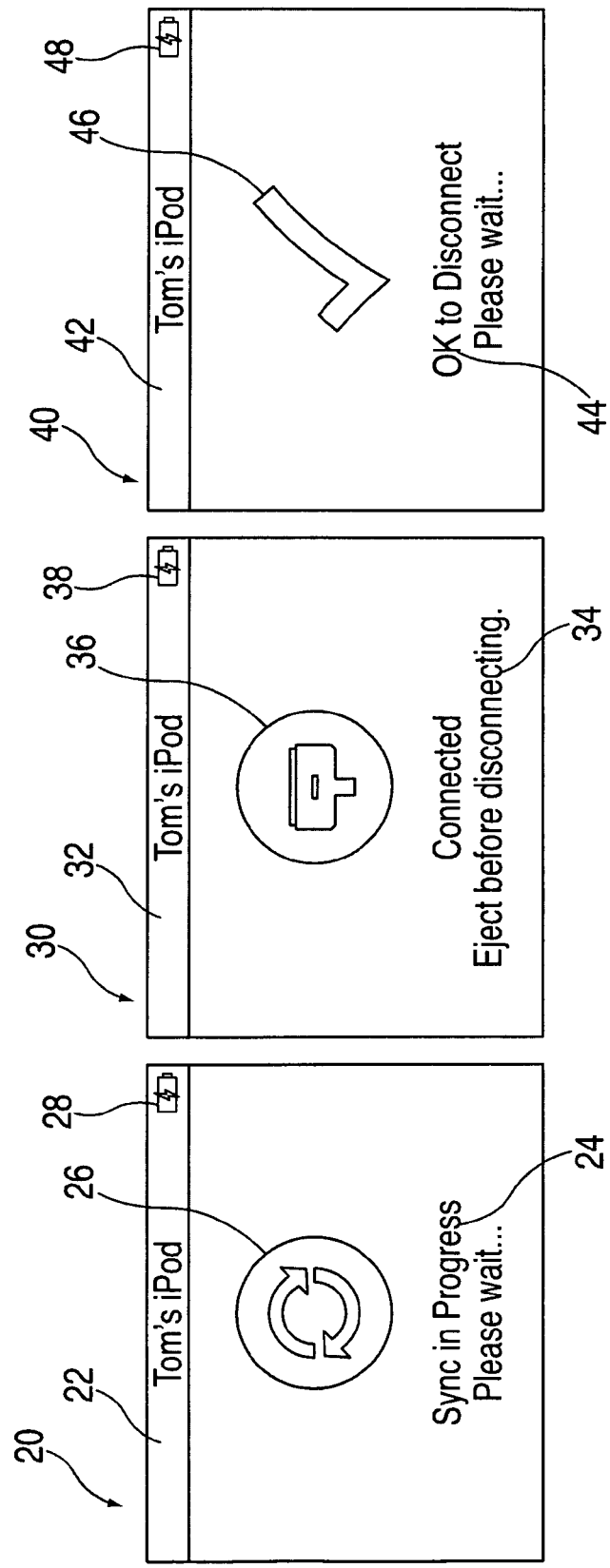

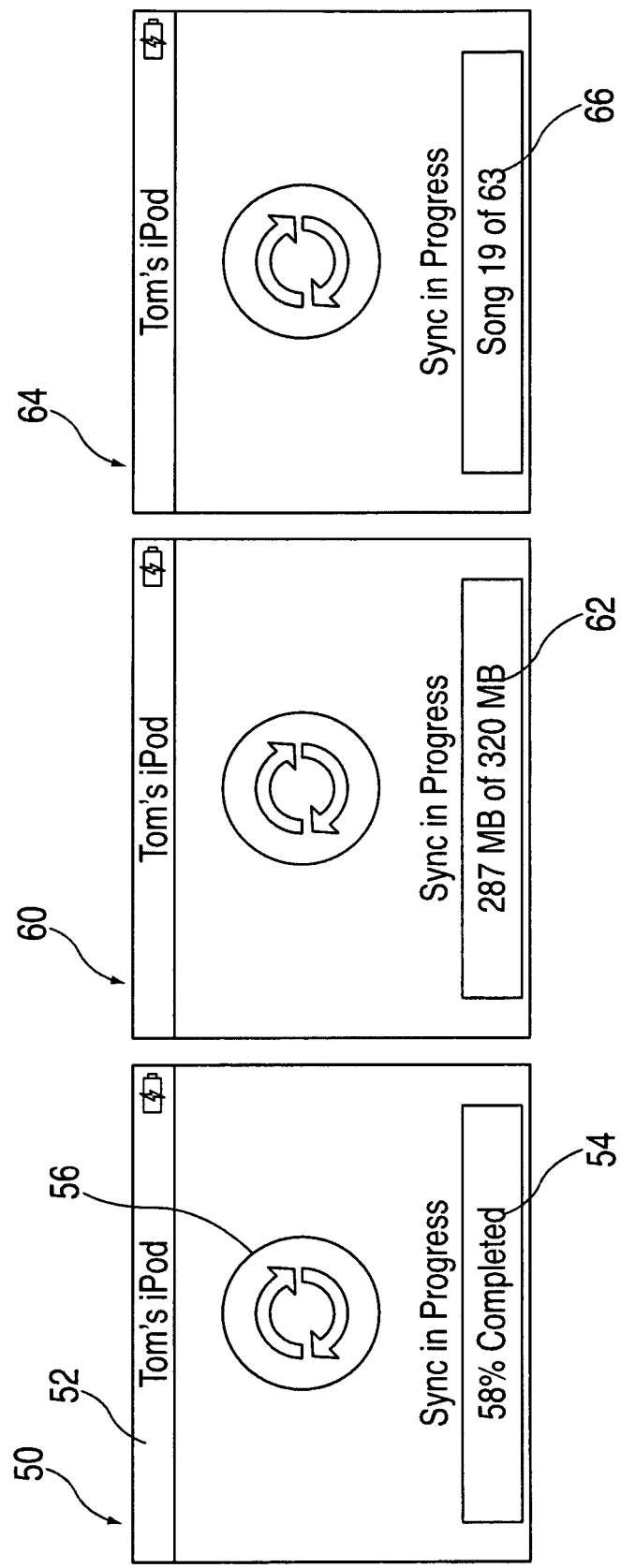

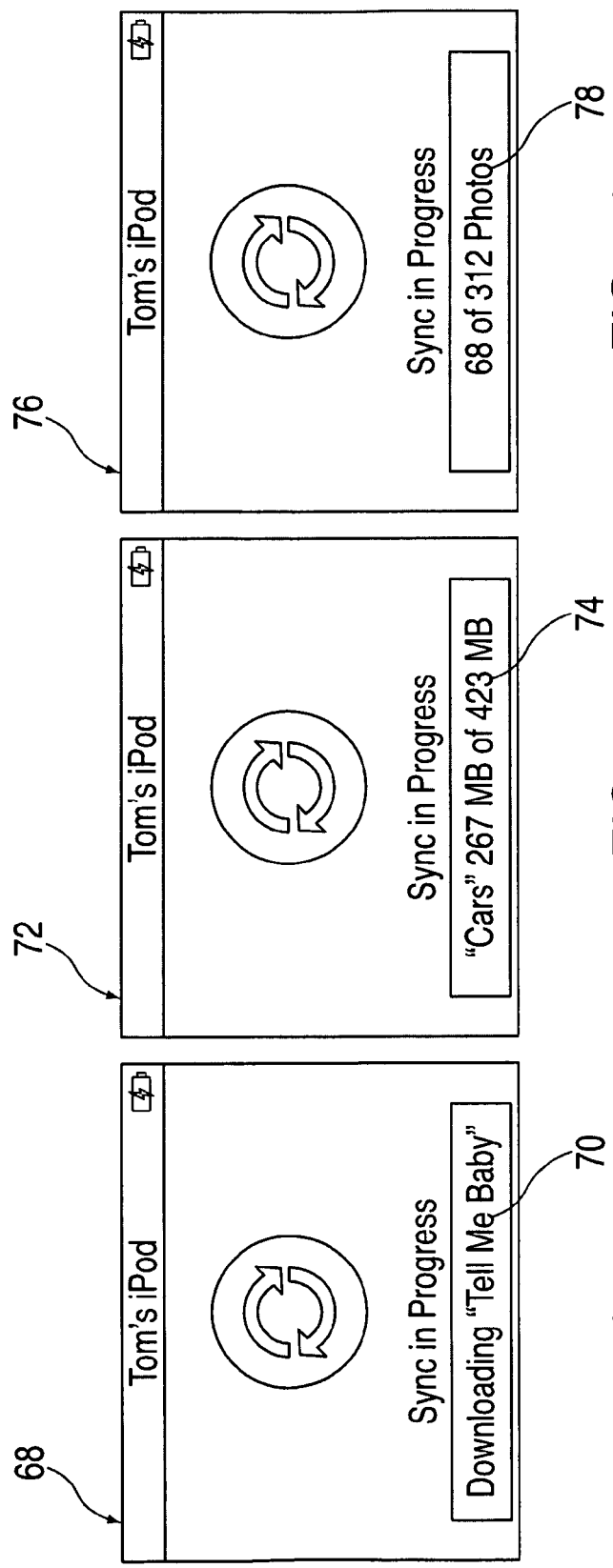

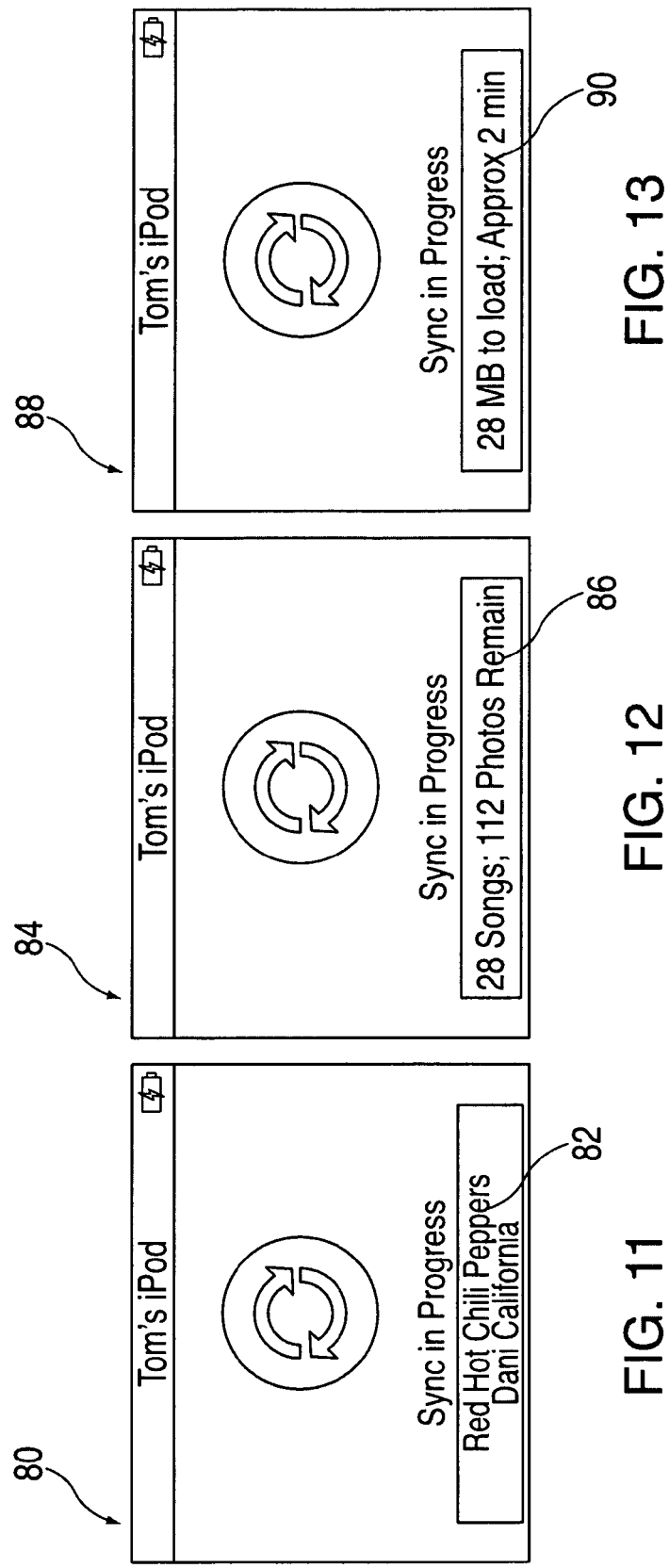

METHOD AND APPARATUS FOR PROVIDING A USER WITH DYNAMIC SYNC STATUS

CROSS-REFERENCE TO RELATED APPLICATIONS

This claims the benefit of U.S. Provisional Application No. 60/967,459, filed Sep. 4, 2007, which is hereby incorporated by reference herein in its entirety.

BACKGROUND OF THE INVENTION

This invention relates to the syncing information between two electronic devices, and particularly to providing a user with information related to the syncing process while it is taking place.

There are many portable electronic devices in use today, such as multi-media devices. Many of these devices are configured such that information can be loaded on to the portable media device from another device, such as a desktop or laptop computer, which acts as the host device. Various forms of information may be transferred from the host device to the portable device, such as personal contact information, e-mails, photos, songs, movie videos, TV shows, podcasts, etc.

It may be typical that the sync process is often accomplished in a manner where the user plugs a cable in to the portable media device which is already connected to the host device (such as a standard USB cable). The host device, after recognizing that a device has been connected to it and communicating with that device to identify it, controls the sync process by sending information to the portable device. In many instances, the sync process is controlled based on settings that have been made by the user, such as which type of information should be transferred (e.g., songs and photos, but not video files).

Once the sync process begins, the user is often left with little or no information as to what is happening until the process is complete. In these instances, the most common information provided to the user is a simple command of "Do Not Disconnect—Sync In Progress," or a similar command. That command may change once the sync process is complete to something similar to "SYNC Complete."

SUMMARY OF THE INVENTION

In accordance with the invention, the user is provided with detailed sync information regarding the sync process as it is occurring. The detailed sync information may include, for example, the status of the sync process, such as an indication of the percentage of information transfer that has occurred or that is remaining. In addition, the detailed information may include information such as the titles of the information being transferred and/or the type of information being transferred.

The status information may be displayed on the entire screen of the portable media device, or the status information may be provided on a portion of the display screen. The host device can send a separate side channel of information that contains data that may be used to display the detailed, real time sync status to the user. For example, the side channel could include information such as "song 2 of 27" being transferred, and that information would then be updated as each new song is transferred. The side channel could also include information such as, for example, the name of the file being transferred and even the artist(s), if such information was relevant (such as when song are being transferred).

Alternatively, the host device could provide the portable media device with all of the information about the sync process prior to transferring any data. In such an instance, for example, the host device could send a packet of information such as: "356 MB to be transferred; 1 video file of 290 MB; 5 photos of 48 MB; 58 songs of 18 MB." The portable media device could then monitor the data being transferred and calculate the overall status of the sync process. This would enable the media device to display in real time the status of the sync process as well as additional information.

Various other alternative embodiments are possible.

In one embodiment, the host device could send the portable media device details of the sync process in addition to providing a side channel with additional information. Under these circumstances, for example, the host device can provide information about the total size of the data to be transferred, as well as the number and type of files to be transferred. Details of the individual files, such as the names and artists of each song, and the names of each TV show, would be transferred using a side channel during the actual sync process.

In another embodiment, the total size of the data transfer and number and types of files to be transferred can be sent as a block of data prior to the sync process beginning, while details can be provided as part of headers prior to each data file. In this manner, details about each individual data file can be provided to the portable media device for display to the user without having to create and utilize a side channel. This enables the transfer of data to operate at as high a speed as possible because the entire bandwidth is being utilized for the transfer of data.

In still another embodiment, the host device can send the portable media device summary information about the sync process at the end of each sync event. This information, which can include a list of all of the new files that were transferred, such as songs, videos, photos, etc., can then be displayed for the user. The portable media device could also display the amount of data transferred and the amount of empty space available for future transfers.

Therefore, in accordance with the present invention, there is provided methods for providing a user with sync information dynamically, such that the user can be apprised of various details of the sync process as it is occurring. The sync process can occur via a physical cable, such as a USB cable, or it can occur wirelessly, such as via a WIFI or Bluetooth connection. The user can be provided with high level details, such as the total amount of data being transferred and the amount that has been transferred in real time. In addition, the user can be provided with low level details about the information being transferred, such as the individual titles of the songs being transferred, as well as the artists. Different low level information can be provided to the user, as may be appropriate, depending on the type of data file being transferred.

Media player apparatus operating in accordance with the methods is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIGS. 2-4 are depictions of representative user interface screens of known sync processes;

FIGS. 5-14 are depictions of representative user interface screens of sync processes in accordance with the principles of the present invention.

DETAILED DESCRIPTION OF THE INVENTION

The invention will now be described in the context of a dedicated electronic media player which can be portable. However, the invention applies to any electronic device capable of receiving data transfers from another electronic device via a sync process, including personal computers. The sync process can occur via a direct physical connection, such as a USB cable, or it can occur wirelessly, such as via a WIFI or Bluetooth connection.

Figure 1:
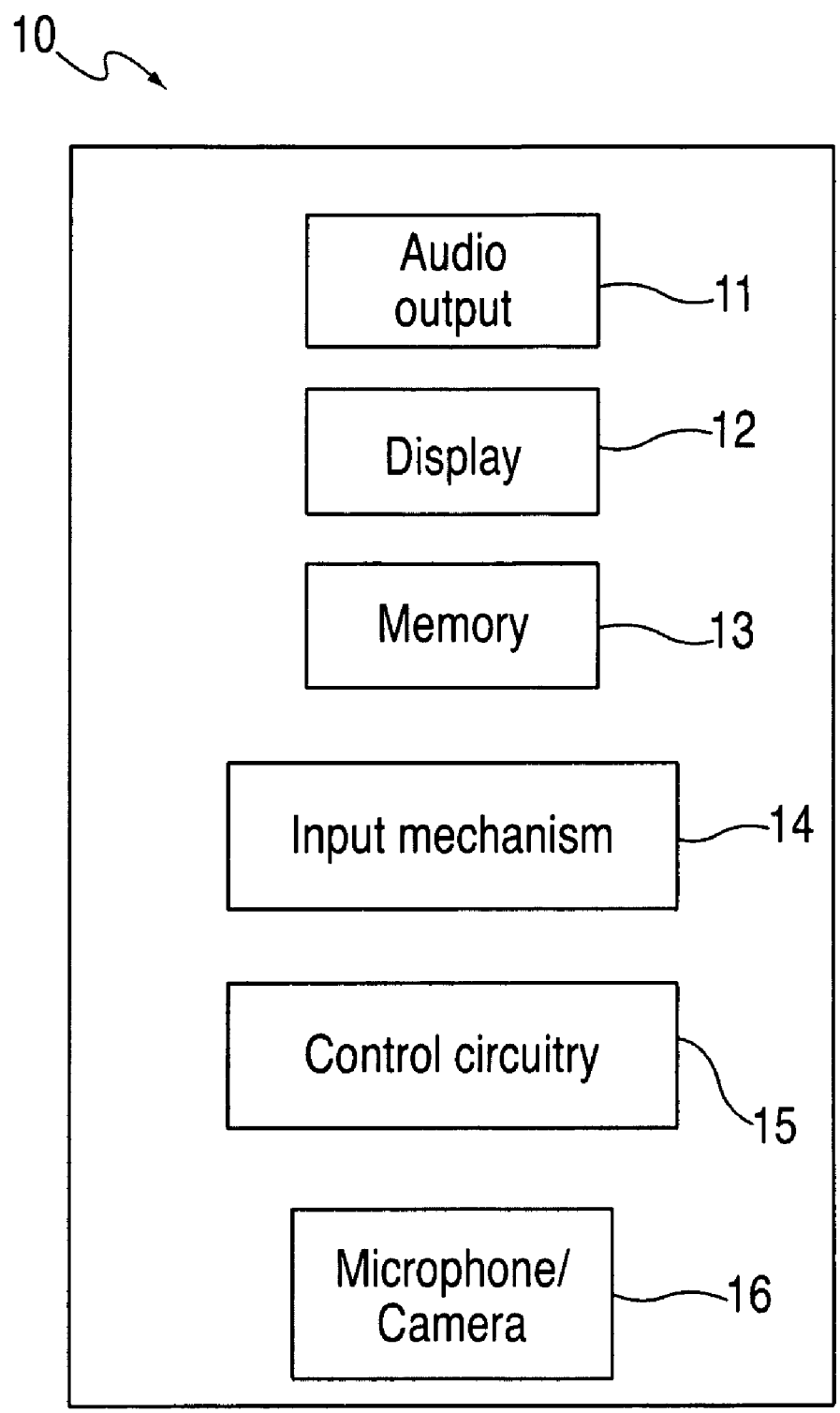
FIG. 1 is a block diagram of a media player which may incorporate the present invention.

FIG. 1 shows an electronic media player 10 which can incorporate the present invention. Media player 10, which can be portable, but need not be, includes an amount of memory 13 suitable for storing media content (e.g., in the gigabyte range). The media content can include, for example, audio presentations or video presentations (which may include audio). Audio output 11 may include one or more speakers or headphone jacks (that can be coupled to headphones) for playing back audio content and/or the audio portion of video content. Display 12 allows the playback of the video portion of video content, and also serves as part of the user interface, displaying command menus, etc. In particular, display 12 can be the location where the dynamic display of sync status is provided to the user in accordance with the principles of the present invention.

Microphone and/or camera 16 can be provided to allow a user to capture live audio and/or video content for storage in memory 13, while input mechanism 14 provides a way to download or otherwise store content provided from elsewhere. Input mechanism 14 can include a connector for physical connection to another electrical device, such as a USB connector. Input mechanism 14 can also include one or more wireless inputs, such as a WIFI input and/or a Bluetooth input. It is also possible for input mechanism 14 to include a user command entry interface, including one or more buttons, dials, touchscreens or other controls on device 10 for interacting with control circuitry 15. Control circuitry 15 includes media playback software and/or circuitry for playing back content stored in memory 13. Control circuitry 15 also can include a processor (e.g., a microprocessor or microcontroller) for controlling the user interface, including the menus or other commands displayed on display 12, the processing of user inputs, and the display of dynamic sync information in accordance with the present invention.

FIGS. 2-4 show various representative interface screens that can be conventionally utilized during the sync process. FIG. 2 shows screen image 20, that can be displayed on display 12, which includes menu bar 22, status message 24 and function icon 26. Menu bar 22 can also include one or more status icons, such as battery icon 28 (which currently indicates that the battery is connected to a source of power and is still being charged). Screen image 20 is similar to many images that are used during sync processes to simply let the user know that a sync process is in progress, so that user is instructed to "Please Wait." There is no other information provided to the user. The user does not know how long the process may take, how far along the process is, what type of information is being synced or anything else. A screen image similar to this may be seen, for example, on an Apple ipod during a typical sync process.

FIG. 3 shows screen image 30, that can be displayed on display 12, which includes menu bar 32, status message 34 and function icon 36. Menu bar 32, as described above with respect to menu bar 22, can also include one or more status icons, such as battery icon 38 (which currently indicates that the battery is connected to a source of power and is still being charged). Screen image 30 is similar to many images that are used when a syncable device is connected to a host device to let the user know that even though no sync process is occurring, the user should not disconnect the syncable device until some action is taken (such as "ejecting" the device). Once again, there is no other information provided to the user. A screen image similar to this may also be seen, for example, on an Apple ipod during a typical sync process.

FIG. 4 shows a screen image 40, that can be displayed on display 12, which includes menu bar 32, status message 44 and function icon 46. Menu bar 42, as set forth above, can also include one or more status icons, such as battery icon 48 (which currently indicates that the battery is connected to a source of power and is still being charged). Screen image 40 is likewise similar to many images that are used with syncable devices, in this instance, the user is essentially given the "All Clear" message that the syncable device may be disconnected from the host device without risk of corruption. A screen image similar to this may be seen, for example, on an Apple iPod during a typical sync process.

FIG. 5, in accordance with the principles of the present invention, shows a screen image 50 that displays dynamic sync status to a user. As in the images described above, screen image 50 includes menu bar 52, status message 54 and function icon 56. Function icon 56, in this instance, is an icon that indicates that a sync function is in progress. Status message 54, however, is not simply a message for the user to wait, as shown in FIG. 2. To the contrary, status message 54 includes a message that provides the user with a real time indication of the percentage of the sync process that is complete (in the example shown in FIG. 3, the process is 58% complete). It may also be advantageous to provide the user with the dynamic sync information in graphic form, such as a bar that fills in as the data is transferred (in this example, slightly more that half the bar would be filled in).

As set forth in more detail below, there are several different methods in which the dynamic sync status information may be determined such that it can be provided to the user on a real time basis. In addition, as described below, there are many different formats and contents that can be provided to the user. These options can be provided to the user for selection through a "Settings" menu in electronic media device 10, they can be set via a "Settings" menu on the host device or they can be set to operate in a set manner.

While various other options of dynamic sync information are shown in the FIGS. and described below, persons skilled in the art will appreciate that other options and combinations of options are possible without depart from the spirit of the present invention.

FIG. 6, for example, shows screen image 60 which includes, among other things, status message 62. In this instance, status message 62 provides the user with dynamic sync status based on the amount of data transferred versus the total amount to be transferred. This user can thus see that "287 MB of 320 MB" have already been transferred as part of the sync process.

FIG. 7 shows another example of dynamic sync status information that can be provided to a user in screen image 64 which includes, among other things, status message 66. In this instance, status message 64 provides the user with dynamic sync status based on the number of songs that have been transferred versus the total number of signs to be transferred as part of this sync process. Thus, this user can see that 19 of 63 songs have been transferred as part of the sync process.

FIG. 8 shows yet another example of dynamic sync status information that can be provided to a user in screen image 68 which includes, among other things, status message 70. In this instance, status message 70 provides the user with dynamic sync status based on the name of the song currently being transferred. Thus, this user can see that the cong "Tell Me Baby" is being transferred right now as part of the sync process.

FIG. 9 shows an example of dynamic sync status information that can be provided to a user when a movie of being transferred in screen image 72 which includes, among other things, status message 74. In this instance, status message 74 provides the user with dynamic sync status based on the name of the movie being transferred as well as the number of megabytes that have been transferred versus the total number of megabytes to be transferred as part of this sync process. Thus, this user can see multiple pieces of information, including that the movie "Cars" is being transferred, as well as the fact that 267 MB out of 423 MB have been transferred as part of the sync process.

FIG. 10 shows an example of dynamic sync status information that can be provided to a user when photos are being transferred in screen image 76 which includes, among other things, status message 78. In this instance, status message 78 provides the user with dynamic sync status based on the number of photos that have been transferred versus the total number of photos to be transferred as part of this sync process. Thus, this user can see that 68 of 312 photos have been transferred as part of the sync process.

FIG. 11 shows another example of the use of multiple pieces of information in the dynamic sync status that can be provided to a user. Screen image 80 which includes, among other things, status message 82 that provides multiple both the name of the band and the name of each song being downloaded via the sync process. Thus, this user can see that the song Dani California by the Red Hot Chili Peppers have been transferred as part of the sync process.

FIG. 12 shows an example of dynamic sync status information that can be provided to a user in screen image 84 which includes, among other things, status message 86. In this instance, status message 86 provides the user with dynamic sync status based on the type and number of files that are remaining in the transfer process. Thus, this user can see that 28 songs and 112 photos are still remaining to be transferred as part of the sync process.

FIG. 13 shows still another example of dynamic sync status information that can be provided to a user in screen image 88 which includes, among other things, status message 90. In this instance, status message 90 provides the user with dynamic sync status based on the amount of data remaining to be transferred as well as a time estimate of how long is remaining in this sync process. Thus, this user can see that 28 MB of data are remaining that will be transferred, and that transfer should take approximately 2 minutes.

As described above, once dynamic sync status information is obtained, there are various ways to provide useful information to the user. Thus, even though specific examples have been shown, other examples, including combinations of the information shown and/or the inclusion of graphic images instead of or in addition to the status messages may be provided without departing from the spirit of the present information. In addition, it is also possible to provide the user with summary and/or detailed information regarding the results of the sync process.

Figure 14:
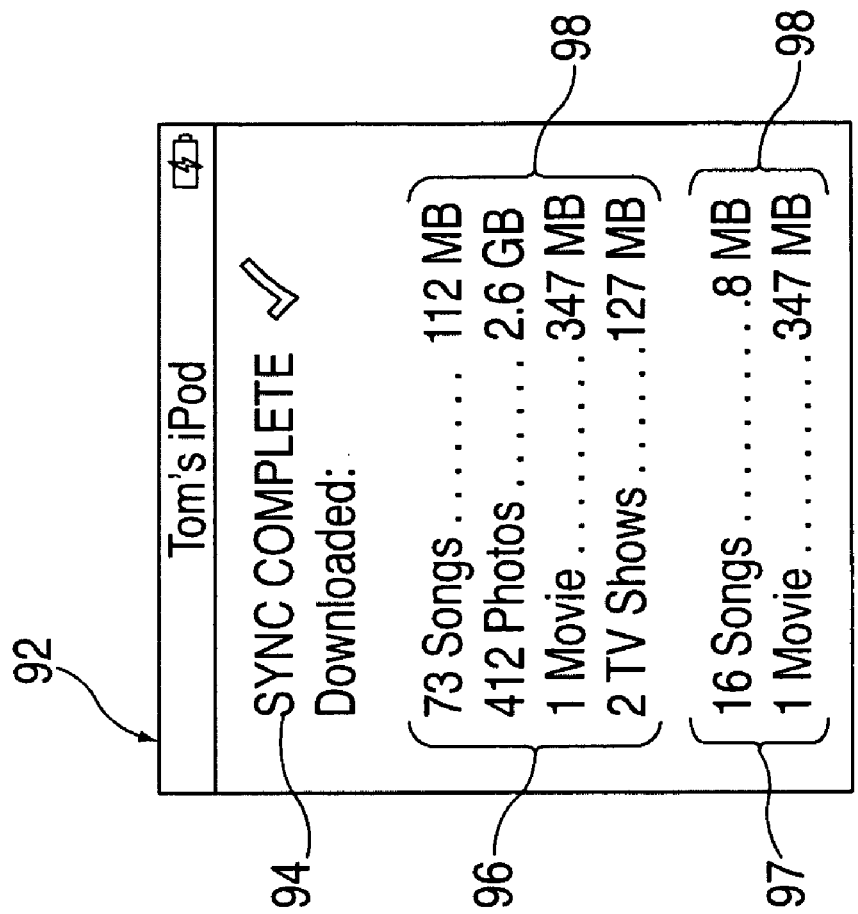

For example, FIG. 14 shows a screen image 92 which includes a result message 94, download summary information 96 and download data summary information 98. In this instance, result message 94 informs the user that the sync process is complete (result message 94 can also include a graphic symbol, as shown in FIG. 14), while download summary information 96 provides the user with a list of the number and type of the data files that were transferred. In addition, download data summary information 98 provides the user with an indication of the total size transferred of each type, and it could also include a summary of the total amount of data transferred. Moreover, screen image 92 may include deleted summary information 97 and deleted data summary information 99. In this instance, deleted summary information 97 provides the user with a list of the number and type of the data files that were deleted, while deleted data summary information 99 provides the user with an indication of the total size deleted of each type, and it could also include a summary of the total amount of data deleted. The user can also be provided with the capability to select any one of the lines in the summary to get access to detailed information about the download and deletion. For example, if the user selected "73 songs," an additional menu (not shown) would be displayed that lists the title for each of the songs downloaded, and the artist information may also be provided.

Dynamic sync status information may be determined and provided to the user in various ways, some of which are set forth below. Persons skilled in the art will appreciate that there are various other ways, including combinations of the ways set forth below, of providing dynamic sync information to a user without departing from the present invention.

Figure 15:
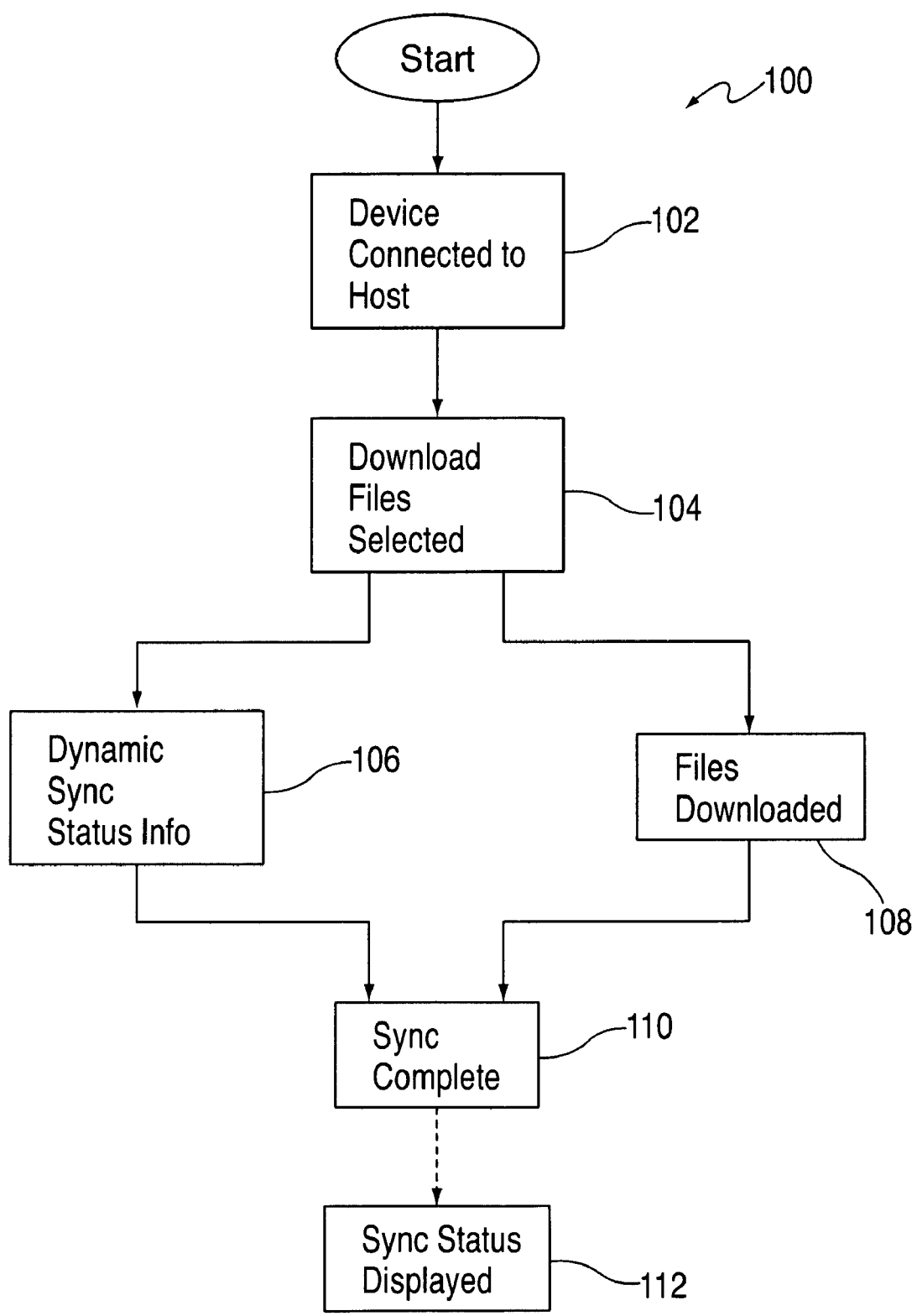
FIGS. 15-17 are flow diagrams illustrating embodiments of the present invention.

One embodiment of providing dynamic sync information in accordance with the present invention is shown in FIG. 15 in logical flow 100. The sync process beings with an electronic device, such as a portable media player similar to media player 10, is connected to a host device in step 102 (this step may occur through a physical connection, such as via a USB cable, or it may occur through a wireless connection, such as a WIFI or Bluetooth connection). Once the device is connected and the sync process is initiated, the host device determines and selects the files to be downloaded in step 104. Persons skilled in the art will appreciate that this step may actually occur prior to the connection being made provided that the host is aware of which electronic devices it has already synced with (in which case the host can determine which new files should be added to the device when, or if, the device is connected again for another sync process).

Once the files are selected, the sync process can occur, and in this instance, the sync process is shown to have two steps that can occur simultaneously. In step 106, dynamic sync information is provided to the connected device, which can be provided to the user in real time on display 12, for example. At the same time, in step 108, the actual files are downloaded from the host to the connected device. The way these steps can occur simultaneously, is that the host device and the connected device can essentially create a side communications channel in which the dynamic sync information is provided from the host to the connected device while the downloading of the actual data files is occurring on the main channel. As set forth above, the dynamic status information can include the name of the current file being downloaded, the number of files already downloaded, the number of files remaining in the download, the percentage of data already downloaded, etc.

Once the files have been downloaded, a sync complete message is sent to the connected device in step 110 (this step may also be determined independently by the connected device, such as under the circumstance where the connected device knows how much data was going to be transferred prior to the transfer and can then, therefore, determine when the transfer is complete). Once the sync process is complete, in this embodiment or in others which follow, or in other example which are not described herein, a step 112 can occur in which summary information of the sync process can be displayed, such as the information shown in FIG. 14 and described above. As set forth above, the display of summary information can be configured as an option by a user in, for example, a "Settings" menu on either the host or connected device.

Figure 16:
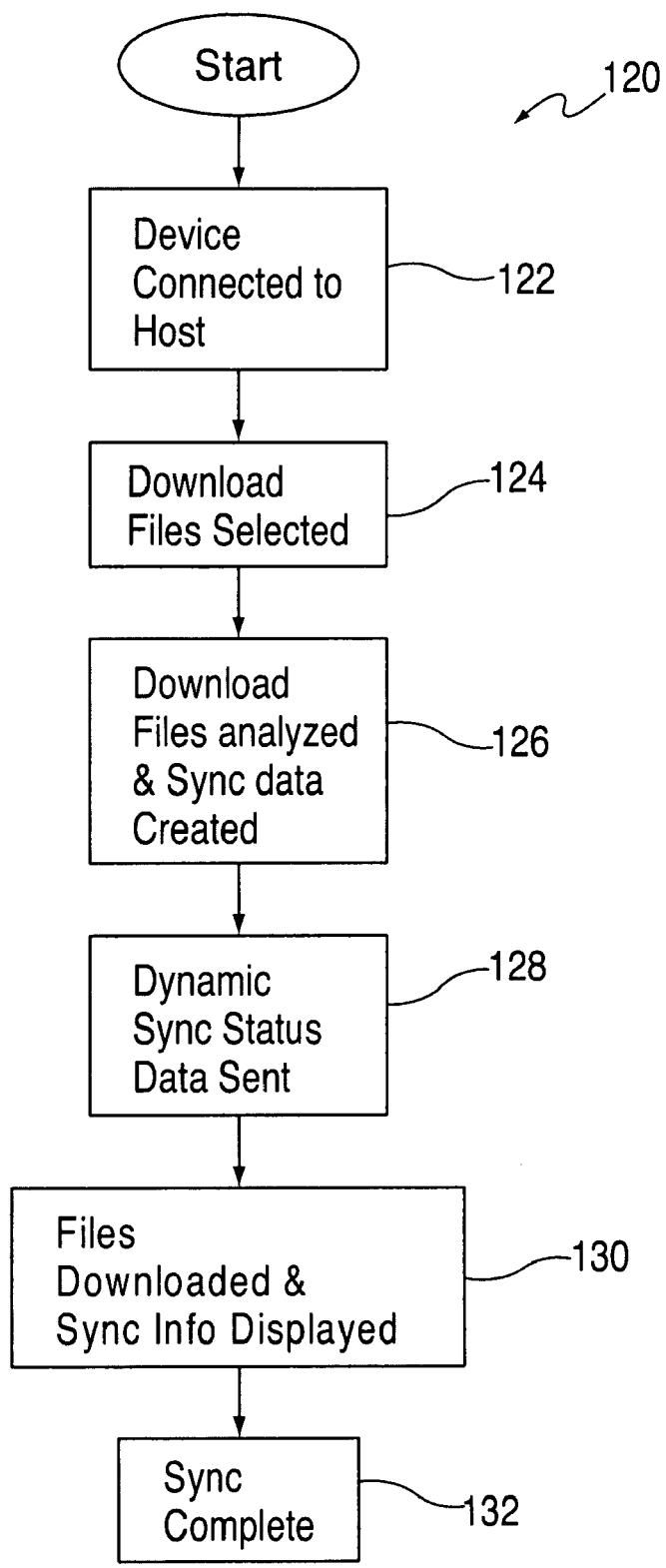

Another embodiment of the present invention is shown in logic flow 120 in FIG. 16. In logic flow 120, dynamic sync status information can be provided to the user without the use of a side channel. The sync process begins when a user connects the electronic device (such as media player 10) to a host device (not shown) in step 122. The host device determines which files are going to be downloaded as part of the sync process and selects them in step 124 (which, as set forth above, may occur prior to the connected device actually being connected).

The files that are to be downloaded are then analyzed by the host device to determine the dynamic sync status information that can be provided to the user. For example, the total amount of data to be transferred can be determined prior to any information being transferred. In addition (or instead), a complete list of the file names and size of each file can be compiled. Once the dynamic sync status information has been collected and prepared, it can be sent in step 128 to the connected device, which can then use that information to determine the dynamic sync status as information is transferred from the host device.

In step 130, the files are download and dynamic sync information can be displayed for the user. Based on the file/size information that was downloaded in step 128, the connected device can monitor the data being transferred during step 130 in order to determine the dynamic sync information. For example, based solely on the total size of the data being transferred, the connected device could provide and update in real time, dynamic information such as that shown and described above with respect to FIGS. 5, 6 and 13, which show, respectively, the percentage of download remaining, the amount in size of the download that has already occurred and the size and approximate time of the download remaining.

If additional information, such as an identification of the number of each type of file (e.g., 128 songs, 37 photos, etc.), is provided to the connected device in step 128, then additional dynamic status information can be provided to the user in a manner similar to that shown in FIGS. 7, 10 and 12. Once the sync process is complete, in step 132, a message and/or icon can be displayed to the user. In addition, if the user has requested such information, summary sync status information can be provided as set forth above in optional step 112.

Figure 17:
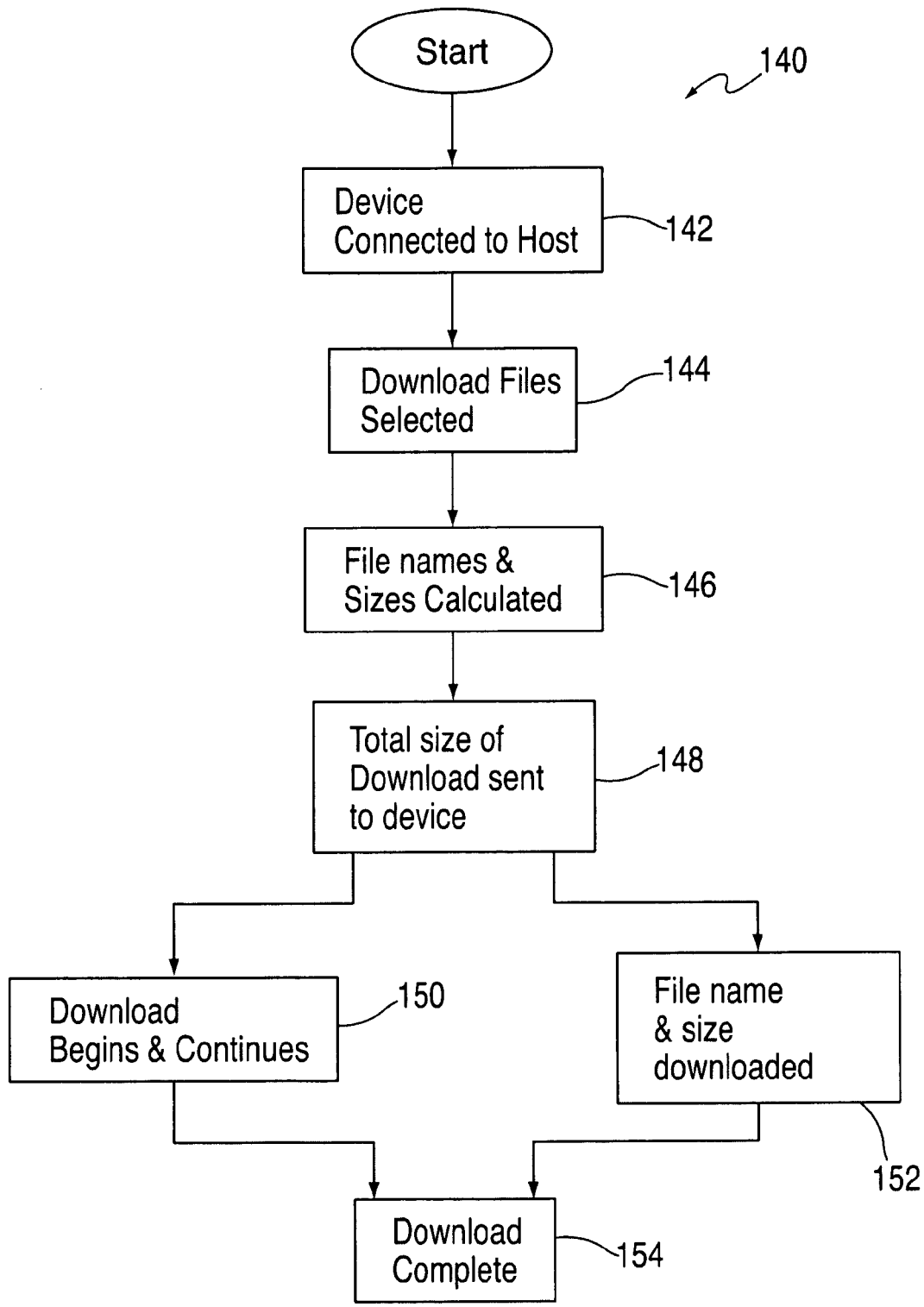

FIG. 17 shows a logic flow 140 of another embodiment of the present invention. Dynamic sync status information is provided to the user as somewhat of a combination of the methods described above with respect to FIGS. 15 and 16. In step 142, the electronic device is connected to the host device, which initiates the sync process. In step 144, the files for the download are determined and selected (or, as set forth above, this step may be accomplished prior to connecting the device with the host). In step 146, the files names and sizes of each file to be downloaded are calculated and compiled.

The total size of the download is sent to the connected device in step 148, which limits the size and time of the pre-sync data transfer. The host device and the connected device then establish main and side channels, in steps 150 and 152, respectively, and data transfer occurs. In step 150, the data files are transferred, while at the same time, file names and sizes of each file are transferred via the side channel in step 152.

The connected device can use the total size information that was transferred in step 148 and the more detailed information that is being transferred via the side channel to provide the user with dynamic sync status information that can vary from simple status such as that shown in FIG. 5, to complex, such as a combination of the information displayed on screen images 6 and 9 (in which case the user would be informed that "Cars" was being downloaded, that 267 MB of 423 MB of Cars had downloaded, and that XX MB out of YY MB of data had been synced out of the total amount of data to be synced). It may even be advantageous to display graphically the overall status of the sync process, as described above.

After all of the files have been downloaded, the download is complete in step 154, whereby the user can be provided with a message and/or icon to indicate that the sync is done. In addition, as described above, it may also be possible for the user to set connected device 10 to display summary or detailed sync summary information as described above and as set forth with respect to optional step 112.

Logic flows 100, 120 and 140 shown in FIGS. 15, 16 and 17, respectively, are merely exemplary and other logic flows could be used to achieve the same results described above in accordance with the principles of the present invention.

Thus it is seen that a method and/or apparatus for providing a user with dynamic sync status information are provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of providing a user with dynamic sync status information, the method comprising:
   identifying that a sync process will occur when an electronic device is connected to a host device;
   receiving information on data files selected to be transferred during the sync process;
   establishing a main channel to download data files between said electronic device and said host device;
   establishing a side channel to download dynamic sync status information between said electronic device and said host device, wherein the status information transmitted on the side channel at a given time pertains to a status of a current transmission of data for a data file from said data files on a main channel to said electronic device occurring at said given time;
   receiving a transmission of data for said data files;
   receiving the status information during the transmission of data for said data files;
   and
   displaying dynamic sync status information on said electronic device while the transmission of data from said data files is occurring.

2. The method of claim 1 wherein said displaying comprises: displaying a percentage representing the amount of the download that has already occurred.

3. The method of claim 1 wherein said displaying comprises: displaying numerically an amount representative of data that has been transferred and of a total amount of data to be transferred during said sync process.

4. The method of claim 1 wherein said displaying comprises:
displaying information that indicates how many of a given type of file have been transferred and a total of how many of said file type have to be transferred during said sync process.

5. The method of claim 1 wherein said displaying comprises:
displaying information that indicates a name of a song currently being downloaded during said sync process.

6. The method of claim 1 wherein said displaying comprises:
displaying information that indicates name of a movie currently being downloaded and how much of said movie has already been downloaded during said sync process.

7. The method of claim 1 wherein said displaying comprises:
displaying information that indicates name and artist of a song currently being transferred during said sync process.

8. The method of claim 1 wherein said displaying comprises:
displaying information that indicates how many files of each type of file are remaining to be transferred during said sync process.

9. The method of claim 1 wherein said displaying comprises:
displaying information that indicates how much data is remaining to be transferred and an approximation of how long it should take to transfer said remaining data during said sync process.

10. The method of claim 1 further comprising: providing said user with summary information that characterizes the data downloaded during said sync process.

11. The method of claim 10 wherein said providing comprises:
providing a listing of each type of data file downloaded during said sync process and how many data file of each type were downloaded.

12. The method of claim 10 wherein said providing further comprises:
enabling a user to request further detailed information regarding the data that was downloaded during the sync process; and
providing the requested detailed information.

13. The method of claim 1, wherein receiving information on data files selected further comprises information on data files selected to be deleted during the sync process, and wherein said method further comprises: deleting said data files selected to be deleted.

14. The method of claim 13 wherein said displaying comprises:
displaying numerically an amount representative of data that has been deleted and of a total amount of data to be deleted during said sync process.

15. The method of claim 13 wherein said displaying comprises:
displaying information that indicates how many of a given type of file have been deleted and a total of how many of said file type have to be deleted during said sync process.

16. The method of claim 1 wherein said displaying comprises:
displaying information that indicates a name of a song currently being deleted during said sync process.

17. The method of claim 1 wherein said displaying comprises:
displaying information that indicates a name of a movie currently being deleted and how much of said movie has already been deleted during said sync process.

18. The method of claim 1 wherein said displaying comprises:
displaying information that indicates a name and artist of a song currently being deleted during said sync process.

19. The method of claim 1 wherein said displaying comprises:
displaying information that indicates how many files of each type of file are remaining to be deleted during said sync process.

20. The method of claim 1 wherein said displaying comprises:
displaying information that indicates how much data is remaining to be deleted and an approximation of how long it should take to delete said remaining data during said sync process.

21. The method of claim 1 further comprising: providing said user with summary information that characterizes the data deleted during said sync process.

22. The method of claim 21 wherein said providing comprises:
providing a listing of each type of data file deleted during said sync process and how many data file of each type were deleted.

23. The method of claim 21 wherein said providing further comprises:
enabling a user to request further detailed information regarding the data that was deleted during the sync process; and providing the requested detailed information.

24. A method of providing a user with dynamic sync status information, the method comprising:
identifying that a sync process will occur when an electronic device is connected to a host device;
receiving information on data files selected to be transferred during the sync process;
receiving dynamic sync status information to said electronic device using a side channel between the host device and the electronic device;
receiving said data files to said electronic device using a main channel between the host device and the electronic device;
monitoring said downloaded dynamic sync status information, wherein the status sync information transmitted on the side channel at a given time pertains to a status of a current transmission of data for a data file from said data files on a main channel to said electronic device occurring at said given time;
creating displayable dynamic sync status information; and
displaying said created dynamic sync status information on said electronic device while the transmission of data from said data files is occurring.

25. The method of claim 24 further comprising:
providing said user with summary information that characterizes the data downloaded during said sync process.

26. The method of claim 24 further comprising:
receiving information on data files selected to be deleted during the sync process; and deleting said data files selected to be deleted from said electronic device.

27. The method of claim 26 further comprising:
providing said user with summary information that characterizes the data deleted during said sync process.

28. A method of providing a user with dynamic sync status information, the method comprising:
identifying that a sync process will occur when an electronic device is connected to a host device;
selecting data files to be transferred during said sync process;
determining total amount of data to be transferred during said sync process;
analyzing said selected files;
creating dynamic sync status information;
sending said total to said electronic device;
establishing a main channel to download data files between said electronic device and said host device;
establishing a side channel to download dynamic sync status information between said electronic device and said host device, wherein the status information transmitted on the side channel at a given time pertains to a status of a current transmission of data for a data file from said data files on a main channel to said electronic device occurring at said given time;
transmitting said data files via said main channel; and
transmitting the sync status information via said side channel.

29. Apparatus for downloading data files via a sync process from a host device, said apparatus comprising:
memory for storing said downloaded data files;
a display for presenting at least (a) a command menu to a user, and (b) dynamic sync status information, to a user;
an input for accepting user commands; and
a processor for:
establishing a main channel for downloading said data files;
establishing a side channel to download dynamic sync status information, wherein the status information transmitted on the side channel at a given time pertains to a status of a current transmission of data for a data file from said data files on a main channel to said electronic device occurring at said given time;
sending said appropriate dynamic sync status information to said display during said sync process.

30. The apparatus of claim 29 wherein said processor continuously updates said appropriate sync status information during the entire sync process as changes occur.

31. The apparatus of claim 29 wherein said processor causes said display to provide said user with graphic and textual versions of said appropriate dynamic status information.

32. The apparatus of claim 29 wherein said processor provides said user with the capability to request a display of summary information regarding said sync process after said sync process is complete.

33. The apparatus of claim 31 wherein said processor provided said user with the capability to request a display of detailed summary information regarding said sync process after said sync process is complete.

34. The apparatus of claim 32, wherein said summary information includes information regarding data files downloaded and data files deleted during the sync process.

35. The apparatus of claim 29 wherein said processor continuously updates said appropriate sync status information during the entire sync process as changes occur, wherein said sync status information includes information regarding data files downloaded and data files deleted during the sync process.

* * * * *